United States Patent
Bhogal et al.

(10) Patent No.: US 7,899,614 B2
(45) Date of Patent: Mar. 1, 2011

(54) PROVIDING ROUTE ALTERNATIVES BASED ON RADIO STRENGTH

(75) Inventors: Kulvir Singh Bhogal, Pflugerville, TX (US); Ravi Krishna Kosaraju, Middle Island, NY (US); Robert Ross Peterson, Austin, TX (US); Lisa Anne Seacat, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 529 days.

(21) Appl. No.: 12/044,769

(22) Filed: Mar. 7, 2008

(65) Prior Publication Data

US 2009/0228199 A1  Sep. 10, 2009

(51) Int. Cl.
*G01C 21/00* (2006.01)
(52) U.S. Cl. .......... 701/201; 701/209; 701/213; 455/513
(58) Field of Classification Search .......... 701/201, 701/207, 209, 213; 340/988; 455/512, 513
See application file for complete search history.

(56) References Cited

U.S. PATENT DOCUMENTS

| | | | |
|---|---|---|---|
| 5,561,851 A | 10/1996 | Hubbell et al. | |
| 6,606,559 B1 | 8/2003 | Beckmann et al. | |
| 6,996,406 B2 | 2/2006 | Lection et al. | |
| 7,277,710 B1 | 10/2007 | Jones et al. | |
| 2002/0081984 A1 | 6/2002 | Liu | |
| 2003/0054831 A1 | 3/2003 | Bardmesser | |
| 2004/0203436 A1 | 10/2004 | Oesterling | |
| 2005/0202825 A1 | 9/2005 | Puranik et al. | |
| 2006/0105702 A1 | 5/2006 | Muth et al. | |
| 2007/0010192 A1 | 1/2007 | Kawamata et al. | |
| 2007/0014536 A1* | 1/2007 | Hellman | 386/94 |
| 2007/0037534 A1 | 2/2007 | Doudnikoff et al. | |
| 2007/0038362 A1* | 2/2007 | Gueziec | 701/117 |
| 2007/0085739 A1 | 4/2007 | Udall | |
| 2008/0057891 A1* | 3/2008 | Klunk | 455/186.1 |

OTHER PUBLICATIONS

Kauhala, Kaarina; Tiilikainen, Thea; "*Radio Location Error and The Estimates of Home-Range Size, Movements, and Habitat Use: A Simple Field Test.*" Finnish Zoological and Botanical Publishing Board. Helsinki, 2002.

* cited by examiner

*Primary Examiner*—Gertrude Arthur Jeanglaud
(74) *Attorney, Agent, or Firm*—Mollborn Patents, Inc.; Fredrik Mollborn

(57) ABSTRACT

Methods and apparatus, including computer program products, implementing and using techniques for determining route alternatives from a starting point to an ending destination for a vehicle, based at least in part on radio signal strength and availability. An input defining a starting point and an ending destination is received. A user input of a radio station preference is received. One or more route alternatives between the starting point and the ending destination are determined based on global positioning system data, the received radio station preference, and information on radio signal strength and availability.

24 Claims, 2 Drawing Sheets

PROVIDING ROUTE ALTERNATIVES BASED ON RADIO STRENGTH

BACKGROUND

This invention relates to Global Positioning System (GPS) techniques. A common pastime when driving a car or other vehicle is to listen to radio broadcasts. One problem many drivers frequently face is to run into poor reception of radio stations, or even a complete lack of service if the driver moves out of range of a radio station.

People also often have specific tastes for radio broadcasts, such as country music, classical music, news broadcasts, easy listening music, sports broadcasts, and so on. When a driver moves out of range of a particular radio station or when the quality of the reception gets worse, for example, when driving between two cities or across several states, the driver must search through available stations to find a new radio station that has good reception and an agreeable selection of content. This process may be inconvenient, especially on longer trips where the driver passes through several cities or states. It can also pose a potential traffic danger, as the driver's attention may be more focused on searching for a good radio station than on what is happening on the road.

A current solution for avoiding situations like the ones described above, is to use a satellite radio, which allows drivers to listen to music broadcast through a satellite in space. The drawback to this solution is that the driver is typically required to invest in a special satellite radio device and to pay a monthly or yearly membership or subscription fee to the provider of the satellite radio broadcasts. Such fees can sometimes be prohibitively expensive to many individuals. Thus, it would be desirable to provide a lower cost alternative that makes available an improved broadcast quality and genre selection of radio stations to drivers.

SUMMARY

In general, in one aspect, the invention provides methods and apparatus, including computer program products, implementing and using techniques for determining route alternatives from a starting point to an ending destination for a vehicle, based at least in part on radio signal strength and availability. An input defining a starting point and an ending destination is received. A user input of a radio station preference is received. One or more route alternatives between the starting point and the ending destination are determined based on global positioning system data, the received radio station preference, and information on radio signal strength and availability.

The invention can be implemented to include one or more of the following advantages. The driver will experience an overall improved radio broadcast quality that is geared to her personal preferences, which will reduce the inconvenience of having to search for particular types of radio broadcasts, and which may also further improve traffic safety, since the driver will not be distracted by adjusting the controls on her radio.

The details of one or more embodiments of the invention are set forth in the accompanying drawings and the description below. Other features and advantages of the invention will be apparent from the description and drawings, and from the claims.

DESCRIPTION OF DRAWINGS

Like reference symbols in the various drawings indicate like elements.

DETAILED DESCRIPTION

The various implementations of the invention described herein pertain to systems and methods that suggest an optimal route for a driver to take, based at least in part on radio signal strength and availability. In particular, a combination including one or more of global positioning system (GPS) data, user preferences, and information on radio signal strengths in a geographical area of interest, is used to determine an optimal route for a driver between the starting location and the final destination. As a result, the driver will experience an overall improved radio broadcast quality that is geared to her personal preferences, which will reduce the inconvenience of having to search for particular types of radio broadcasts, and which may also further improve traffic safety, since the driver will not be distracted by adjusting the controls on her radio.

Various implementations of the invention will now be described by way of example and with reference to the drawings. It should be noted that although the examples below refer to radio broadcasts, the concepts described herein are applicable to any type wireless broadcasts, such as television or video broadcasts, or wireless Internet broadcasts. Thus, various modifications to the examples described herein will be readily apparent to those skilled in the art, and such modifications are intended to fall within the scope of the claims.

Figure 1A:
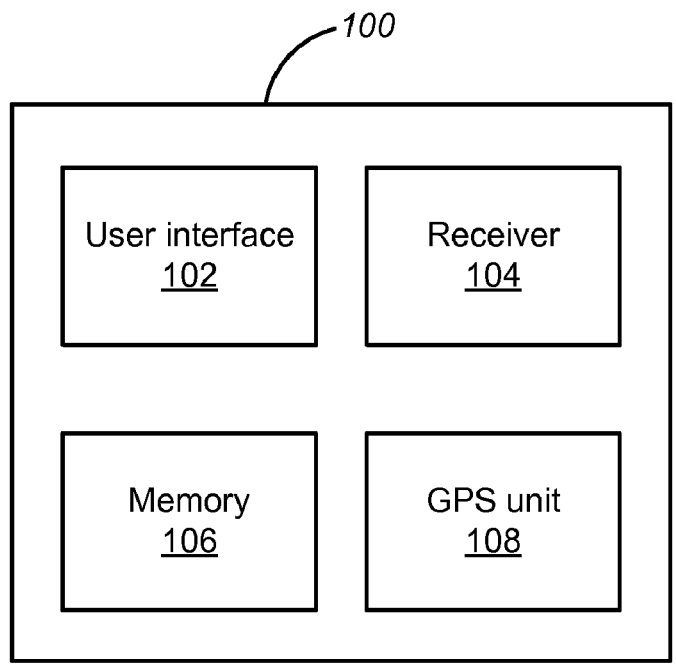
FIG. 1A shows a route determination device in accordance with one embodiment of the invention.

FIG. 1A shows a route determination device (100) in accordance with one embodiment of the invention. The route determination device (100) can be a portable device or a device that is permanently mounted in a vehicle, such as a car, truck, SUV, van, boat, or the like, which also is equipped with a radio for listening to radio broadcasts.

The route determination device (100) includes a user interface (102) through which a user can enter information into the device, such as a starting location and a final destination for a trip that is to be undertaken. The user interface (102) also includes means for providing information to the user, such as a display showing a planned route for the trip or speakers for providing audible instructions to the user while driving from the starting point to the final destination. The actual mechanisms for inputting information through the user device can be standard mechanisms that are well known to those of ordinary skill in the art, such as buttons, on-screen touch controls, voice commands, and so on.

The route determination device (100) further includes a receiver (104) for radio station coverage information. Conceptually, the radio station coverage information can be thought of as a "map" of radio signal strength for various radio stations over a geographical area. This map can be stored in a remote database and be broadcast or otherwise wirelessly transmitted to the receiver (104), where the map is used when determining a route, as will be described in further detail below.

When the radio signal strength map is received by the route determination device (100), the map is stored in a memory (106), from which the radio coverage information can be retrieved by a GPS unit (108) when determining a route between the starting point and final destination for a trip to be undertaken. The GPS unit (108) operates similar to conventional GPS units that can be used to determine routes between two locations. However, a significant difference is that the GPS unit (108) communicates with the memory (106) when determining the route, such that the radio station coverage is taken into account during the route determination. As a result, an optimal route with minimal radio station coverage problems or loss can be determined.

Figure 1B:
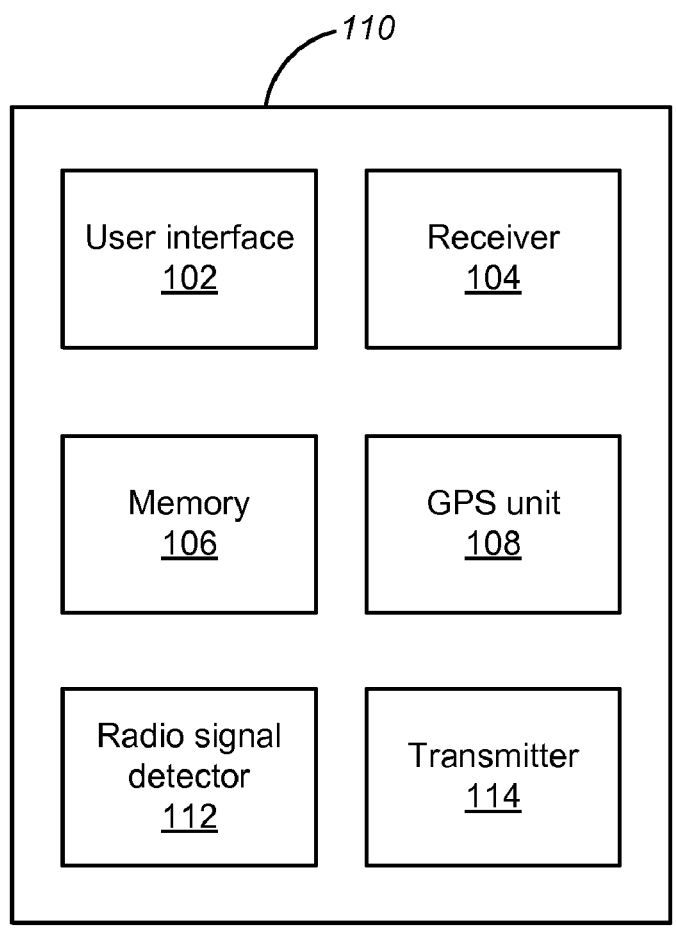
FIG. 1B shows a route determination device in accordance with another embodiment of the invention.

FIG. 1B shows a route determination device (110) in accordance with another embodiment of the invention. As can be seen in FIG. 1B, the route determination device (110) is similar to the route determination device (100) shown in FIG. 1A, but further includes a radio signal strength detector (112) and a transmitter (114). The signal strength detector (112) can be used to measure the radio signal strength as a user is driving in a specific area. This information can then be transmitted with the transmitter (114) to a remote database storing the radio station coverage maps. As a result, the maps can be continuously updated and accurate and current information can be provided to the route determination device (110) of other drivers in the same area. This can be beneficial since the radio station signal strength may often vary due to weather or other atmospheric conditions.

In yet other embodiments, the radio signal strength data may be stored locally in the memory (106), so that each car has its own local map of radio station coverage for the geographic areas in which it typically travels. This may have some advantages in that the map is specific to the particular setup of the vehicle, that is, a car with a high-quality antenna and radio system can have a map that looks differently from a map in a car with low-quality equipment, even though the two cars are typically driven in the same geographical area.

Figure 2:
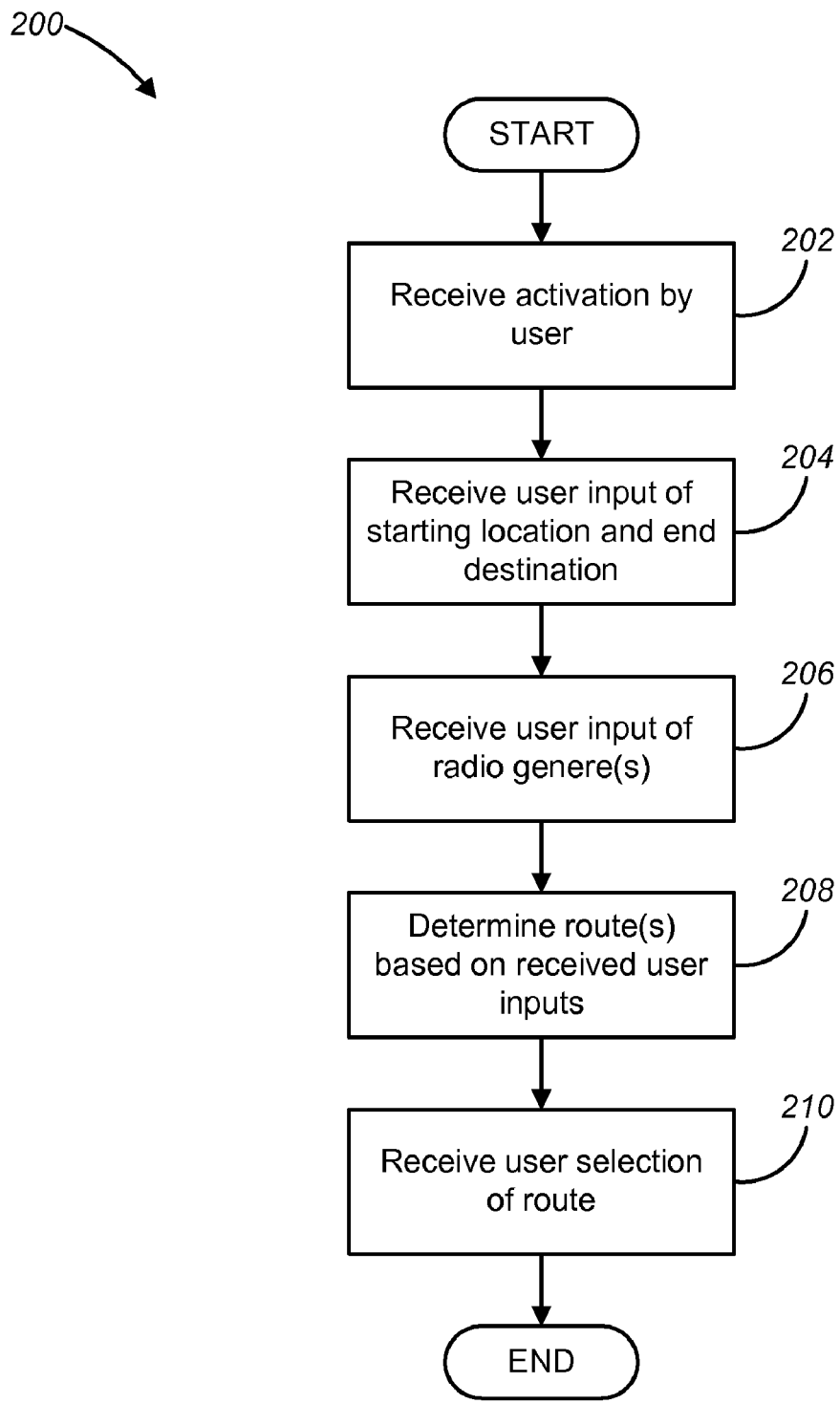
FIG. 2 shows a process for determining a route in accordance with one embodiment of the invention.

An example of how the route determination device can be used in accordance with one embodiment of the invention will now be described with reference to FIG. 2. As can be seen in FIG. 2, a process (200) for determining a route in accordance with one embodiment of the invention starts by the route determination device (100) being activated by user (step 202). The activation will cause the route determination device (110) to start receiving a radio coverage map. It should be noted that in the various embodiments of the invention, the radio coverage map can be streaming into the route determination device (100) on a continuing basis, or the map can be downloaded periodically and stored in the memory (106).

Next, a user input is received, which includes a starting location and an ending destination for the route (step 204). Typically, the starting location and ending destination are input as street addresses, but they can also be input as coordinate locations or names of famous places or airport codes, for example, as is common in conventional GPS navigation systems.

After the starting point and ending destinations have been input, a user input with one or more radio genres is received (step 206). The radio genres can be, for example, country music, classical music, news broadcasts, easy listening music, sports broadcasts, and so on, and can be provided to the user as a list of options from which the user can make selections. The user selections indicate what type of radio broadcasts the user would like to listen to during her trip from the starting point to the ending point. The user may indicate a single type of radio broadcasts, several types, or a mix of all available types that she may find to be agreeable for the trip.

Next, the route determination device (100) determines one or more routes based on the inputs received from the user and the radio coverage map for the area between the starting point and ending destination (step 208), and presents the one or more route alternatives to the user. For example, the system may determine that if the user is only willing to listen to classical music, then a longer route or a route with fewer freeways must be taken, whereas if the user is willing to listen to a combination of classical music and news broadcasts, then a faster route can be taken. In some embodiments, the user may also specify what kind of emphasis to place on finding a fast route, versus finding a route that has the ideal music selection. For example, it may be desirable to a user to take the quickest route when going to work in the morning, whereas on the way home from work, he may have time to take a longer route and listen to his favorite music instead. In some embodiments, the system may take such preferences into account when determining the route.

Next, the user selects a route among the various suggestions (step 210), which will be the route that the route determination device (100) will use when guiding the user on the trip, and the process ends.

In some embodiments, the route determination device can also generate warnings if a user is approaching an area of low or nonexistent coverage, so that the user can take action, such as selecting a different route. The user can also define when the alert should be issued, for example, when the quality of reception goes down to a specific level, the method of alert, which may include sounds in addition to screen display, and the size and scale of geographic coverage to be included, which will determine how far in advance alerts will be issued.

Similarly, in some embodiments, if the user decides to switch radio stations while en route, the route determination device can determine if the current route can be maintained while having good and acceptable reception of the new radio stations. If the route determination device determines that there will be a loss of radio coverage, then the route determination device may suggest a different route to the user that will maintain an acceptable reception of the current radio station selection The route determination device can also be integrated with the user's radio in the vehicle, so that the route determination device automatically changes radio stations whenever feasible, for example, if the user has selected a specific genre without specifying individual radio stations. Alternatively, the route determination device can provide recommendations to the user through the user interface (102) about when to change radio stations and which frequency to select. Many variations of these parameters can be envisioned by those of ordinary skill in the art.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

A number of implementations of the invention have been described. Nevertheless, it will be understood that various modifications may be made without departing from the spirit and scope of the invention. For example, the input of radio station selections and starting and ending points of the route can be made in any order. The radio station maps have been described as being broadcast to the route determination device, but can of course be downloaded to the device as well through any wired or wireless connection to a network, such as the Internet. In some embodiments, the user may not enter a final destination, but instead the route determination device may display a map of the area surrounding the user's current position and indicate, through visual or auditory means, which roads not to go down, based on the likelihood of losing a current radio station. For example, as the user looks at the map that is displayed on the route determination device, the user may see different colored roads, where red can indicate roads to be avoided, yellow can indicate roads that might have poor radio reception quality, and green can indicate roads that allow the user to listen to their radio station of choice. Some embodiments can allow the user to pre-specify one or more preferred radio stations for a given geographical region. Accordingly, when that region is visited then the radio station of choice will automatically play. Accordingly, other embodiments are within the scope of the following claims.

The invention claimed is:

1. A method for determining route alternatives from a starting point to an ending destination for a vehicle, based at least in part on radio signal strength and availability, comprising:
   receiving a user input defining a starting point and an ending destination;
   receiving a user input of a radio station preference; and
   determining one or more route alternatives between the starting point and the ending destination based on global positioning system data, the received radio station preference, and information on radio signal strength and availability.

2. The method of claim 1, further comprising:
   presenting the one or more route alternatives to the user; and
   receiving a selection of a route alternative from the user.

3. The method of claim 1, wherein receiving a user input of a radio station preference includes:
   receiving one or more of: an identification of a specific radio station, an identification of a specific genre, an identification of a combination of radio stations, and an identification of a combination of genres.

4. The method of claim 1, wherein receiving a user input of a radio station preference includes:
   receiving a user input pre-specifying one or more preferred radio stations for a given geographical region.

5. The method of claim 4, wherein determining one or more route alternatives includes:
   determining one or more route alternatives between the starting point and the ending destination based on global positioning system data, the pre-specified received one or more radio stations, and information on radio signal strength and availability for the pre-specified one or more radio stations.

6. The method of claim 1, further comprising:
   receiving a user input indicating the importance of the radio station preferences in relation to a fastest route between the starting point and the ending destination.

7. The method of claim 1, further comprising:
   determining, while being en route between the starting point and the ending location, whether the radio station coverage is less than acceptable on the selected route.

8. The method of claim 7 further comprising:
   selecting a different route in response to determining that the radio station coverage is less than acceptable on the selected route, wherein the different route has been determined to be acceptable based on the radio station coverage information.

9. The method of claim 7, further comprising:
   providing an alert to the user in response to determining that the radio station coverage is less than acceptable on the selected route, wherein the different route has been determined to be acceptable based on the radio station coverage information.

10. The method of claim 1 further comprising:
    continuously receiving a stream of radio signal strength and availability while being en route between the starting point and the ending destination.

11. The method of claim 1 further comprising:
    periodically receiving radio signal strength and availability information.

12. A method for determining route alternatives for a driver of a vehicle, based at least in part on radio signal strength and availability, comprising:
    receiving a user input of a radio station preference;
    identifying a current location of the vehicle;
    determining one or more route alternatives based on global positioning system data, the received radio station preference, and information on radio signal strength and availability, wherein each route alternative includes a reception quality indication for the radio station preference; and
    presenting the one or more route alternatives to the driver.

13. A route determination device, operable to determine route alternatives from a starting point to an ending destination for a vehicle, based at least in part on radio signal strength and availability, comprising:
    means for receiving a user input defining a starting point and an ending destination;
    means for receiving a user input of a radio station preference; and
    means for determining one or more route alternatives between the starting point and the ending destination based on global positioning system data, the received radio station preference, and information on radio signal strength and availability.

14. The device of claim 13, further comprising:
  means for presenting the one or more route alternatives to the user; and
  means for receiving a selection of a route alternative from the user.

15. The device of claim 13, wherein the means for receiving a user input of a radio station preference includes:
  means for receiving one or more of: an identification of a specific radio station, an identification of a specific genre, an identification of a combination of radio stations, and an identification of a combination of genres.

16. The device of claim 13, wherein the means for receiving a user input of a radio station preference includes:
  means for receiving a user input pre-specifying one or more preferred radio stations for a given geographical region.

17. The device of claim 16, wherein the means for determining one or more route alternatives includes:
  means for determining one or more route alternatives between the starting point and the ending destination based on global positioning system data, the pre-specified received one or more radio stations, and information on radio signal strength and availability for the pre-specified one or more radio stations.

18. The device of claim 13, further comprising:
  means for receiving a user input indicating the importance of the radio station preferences in relation to a fastest route between the starting point and the ending destination.

19. The device of claim 13, further comprising:
  means for determining, while being en route between the starting point and the ending location, whether the radio station coverage is less than acceptable on the selected route.

20. The device of claim 19 further comprising:
  means for selecting a different route in response to determining that the radio station coverage is less than acceptable on the selected route, wherein the different route has been determined to be acceptable based on the radio station coverage information.

21. The device of claim 19, further comprising:
  means for providing an alert to the user in response to determining that the radio station coverage is less than acceptable on the selected route, wherein the different route has been determined to be acceptable based on the radio station coverage information.

22. The device of claim 13 further comprising:
  means for continuously receiving a stream of radio signal strength and availability while being en route between the starting point and the ending destination.

23. The device of claim 13 further comprising:
  means for periodically receiving radio signal strength and availability information.

24. A route determination device, operable to determine route alternatives for a driver of a vehicle, based at least in part on radio signal strength and availability, comprising:
  means for receiving a user input of a radio station preference;
  means for identifying a current location of the vehicle;
  means for determining one or more route alternatives based on global positioning system data, the received radio station preference, and information on radio signal strength and availability, wherein each route alternative includes a reception quality indication for the radio station preference; and
  means for presenting the one or more route alternatives to the driver.

* * * * *